Feb. 7, 1928.
C. R. PATON
1,658,612
AUTOMOBILE CONSTRUCTION
Filed Nov. 22, 1926    2 Sheets-Sheet 1
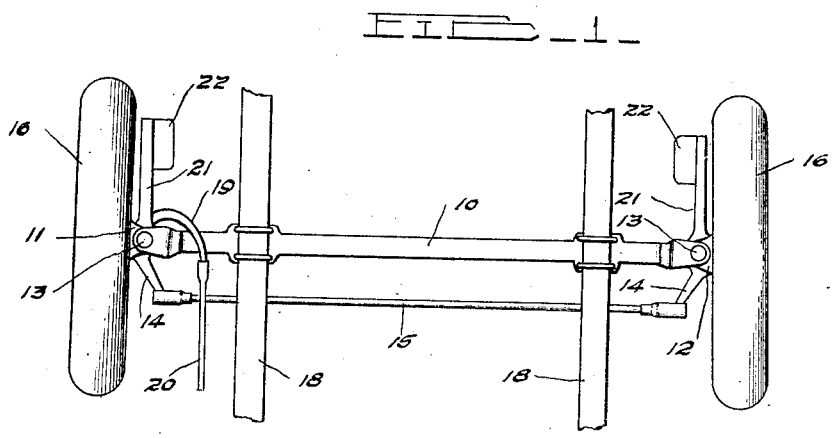
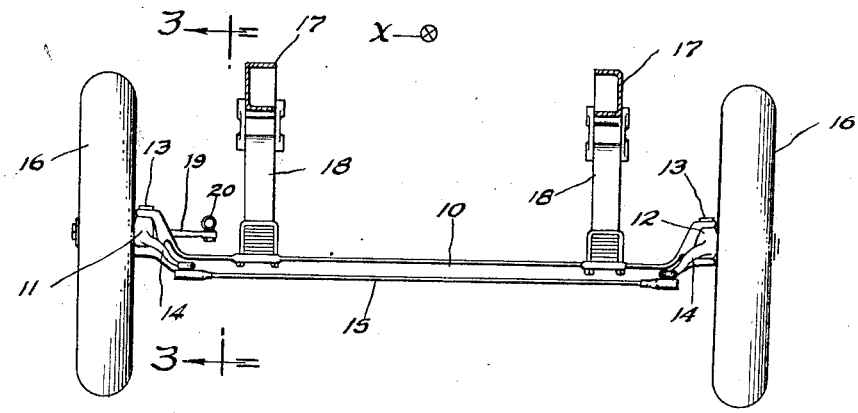
INVENTOR
Clyde R. Paton
BY
P. M. Pomeroy
ATTORNEY Feb. 7, 1928.
C. R. PATON
1,658,612
AUTOMOBILE CONSTRUCTION
Filed Nov. 22, 1926
2 Sheets-Sheet 2
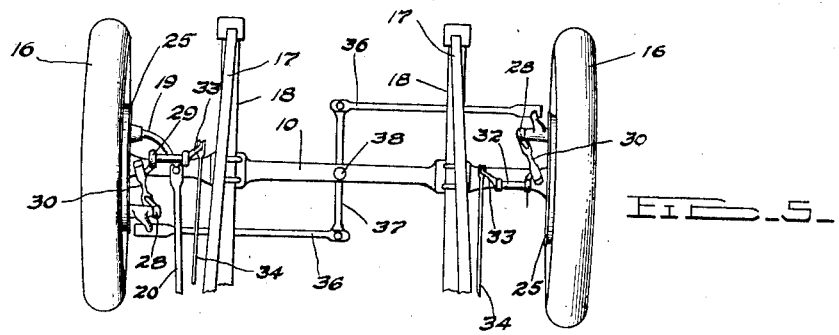
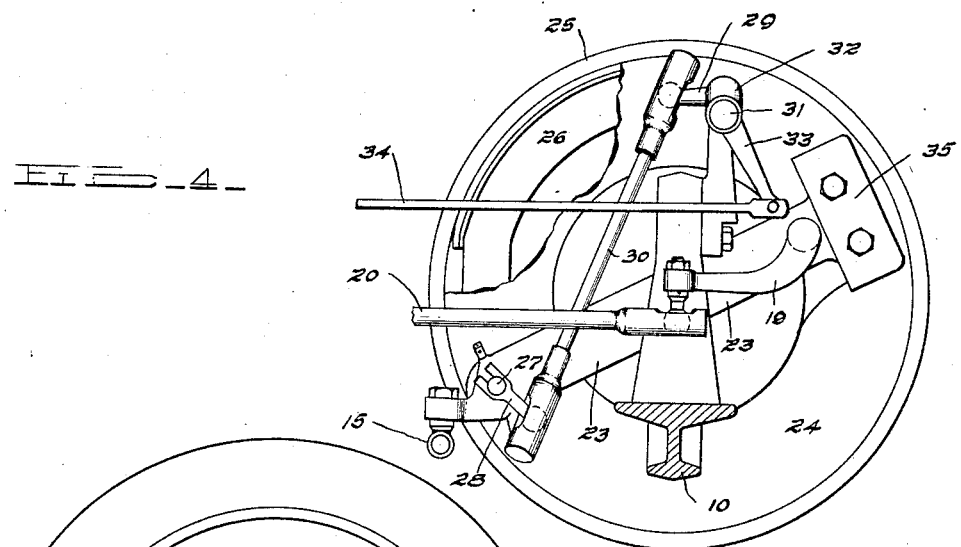
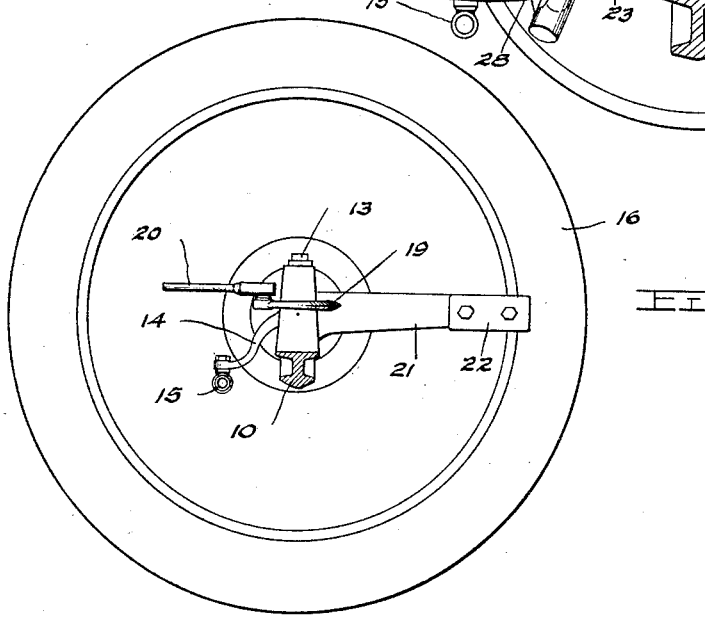
INVENTOR
Clyde R. Paton
BY
ATTORNEY Patented Feb. 7, 1928.

1,658,612

UNITED STATES PATENT OFFICE.

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY.

AUTOMOBILE CONSTRUCTION.

Application filed November 22, 1926. Serial No. 150,063.

This invention relates to motor vehicle construction and particularly to the construction of those parts thereof that are subject to those violent vibratory movements commonly known as "shimmying," the principal object being the provision of a construction in which the conditions tending to cause one of the shimmying movements are eliminated, thereby eliminating the shimmying itself caused by such conditions.

Another object is to provide a construction of the class described in which the parts attached to and connecting the steering wheels, and moving relative to the front axle, are balanced forwardly and rearwardly in respect to a plane passing through the axes of both the steering knuckle king pins.

Another object is to provide a construction of the class described in which the parts attached to and connecting the steering wheels, and moving relative to the front axle, are constructed to effect an equal distribution of weight moments forwardly and rearwardly of a plane passing through the axes of the axle king pins, whereby movement of the axle longitudinally of its length will not tend to cause said parts to move relative to the axle.

Another object is to provide a non-shimmying construction of the class described wherein those parts connecting the steering wheels and moving relative to the front axle are balanced in a plane passing through the axes of the steering king pins, either by the use of balancing masses or by an arrangement of such parts to effect a balanced condition of the same.

A further object is to provide means for eliminating the shimmy of an existing shimmying structure of the class described, comprising the addition of a mass or masses to such structure and at such points whereby to balance the parts connecting the wheels and movable relative to the front axle, on either side of a plane passing through the axes of the king pins.

The above being among the objects of the present invention, the same consists of certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Figure 1 is a plan view of the front axle and steering wheels of a motor vehicle together with other co-operating mechanism.

Figure 2 is an elevation of the parts shown in Figure 1, looking from the rear of the vehicle.

Figure 3 is a sectional view taken on the line 3—3 of Figure 2.

Figure 4 is a view corresponding to Figure 3, but showing the present invention in combination with a conventional front wheel brake construction.

Figure 5 is a plan view corresponding to Figure 1, but of a construction embodying front wheel brakes of the type shown in Figure 4, in which the conventional arrangement of parts has been changed in accordance with the present invention.

Those violent vibratory movements of the steering mechanism of motor vehicles which are commonly known as "shimmying" have, since the advent of low pressure tires in the motor vehicle industry, assumed proportions of great concern, and much time and energy have been spent in an effort to determine the causes and to effect remedies therefor. Various and widely different theories have been advanced as to the causes of shimmying and remedies suggested, and while some such remedies have been successful, or partly successful, in respect to certain constructions and certain conditions, they have not to my knowledge been successful in removing one of the shimmying movements, which would indicate that the real cause of that movement has not been recognized. Others have attempted to eliminate shimmying without attempting to eliminate the cause, which is witnessed by those constructions which employ friction devices to dampen the movement of the shimmying parts, thus defeating the desirable condition of easy steering which they are attempting to acquire through other means.

After a thorough investigation of the movements of shimmying parts of various constructions, I have observed in shimmying structures of conventional designs, that when a tire strikes an obstruction in the road, the force tends to drive that tire upward. When this happens, the front axle and parts connected thereto tend to pivot about a point midway between the wheels and a substantial distance above the axle, such as the point X shown in Figure 2, which point may vary according to the construction of the vehicle under consideration. This pivotal tendency acts to give the front axle a longitudinal movement, and the axle accordingly attempts to carry with it those parts that are connected thereto and movable therewith, such as the steering knuckles, cross tube arms, cross tube, and front wheel brake mechanism where such brakes are employed, but due to the fact that in all conventional constructions the mass of such parts, as a whole, is not balanced on each side of the front axle, or more correctly, on either side of a plane passing through the axes of the king pins, the heavier side resists this movement to a greater extent than the lighter side, with the result that a rotary movement about the king pins is imparted to the steering knuckles and mechanism carried thereby about their respective king pins. It has been observed that the shimmying movement of the parts referred to is caused to a great extent by a longitudinal reciprocal movement of the front axle combined with a condition of unbalance of these parts in respect to a plane passing through the king pins as previously mentioned. This conclusion is borne out to a great extent by the fact that the amplitude of longitudinal movement of the axle is dependent upon the rigidity of the springs connecting the front axle to the chassis frame, and due to the fact that with more rigid spring structures less shimmying results. As the result of these observations I have conceived the present invention which nullifies any tendency of longitudinal movement of the front axle to cause oscillation of the parts connecting the steering wheels and pivoted to the front axle. Although numerous applications of this invention may be made, I show in the accompanying drawings two practical embodiments which will achieve the result intended, but I do not limit the present invention to these constructions.

In Figures 1 and 2 is shown a construction which, except for the parts which will afterwards be explained, is conventional and includes a front axle 10 to either end of which are pivotally secured the steering knuckles 11 and 12 by the king pins 13. Each knuckle 11 and 12 is provided with a rearwardly extending cross tube arm 14, the free ends of which are joined by the cross tube 15 which constrains the wheels to move in a predetermined relation in respect to each other. The wheels 16 are rotatably mounted on spindles (not shown) carried by the knuckles 11 and 12. The axle 10 is secured to the chassis frame 17 by means of the usual springs 18. A curved arm 19 projecting in a generally inward direction from the spindle 11 is connected by the usual drag link 20 to the steering gear (not shown). This construction does not employ front wheel brakes as is readily apparent from Figures 1, 2, and 3, and as so far described is conventional in every respect. The new or unconventional parts of the construction shown in Figures 1, 2 and 3 are the arms 21 which project forwardly from each knuckle 11 and 12 and each of which is provided with a mass 22 secured to its free end. If these unconventional parts 21 and 22 are disregarded for the moment, it will be noted that the cross tube arms 14 and cross tube 15 all lie on the rearward side of a plane passing through the axes of the king pins 13 and that there is practically nothing forward of such plane to balance the weight thereof. The remainder of the parts, including the knuckles 11 and 12, and other parts connected thereto, are substantially equally disposed on each side of the plane referred to. Now supposing the right hand wheel of Figure 2 is lifted, causing the axle and parts carried thereby to swing about the point X as a center, the axle 10 will be caused to have a relatively longitudinal movement to the right. When the axle 10 thus moves to the right the knuckles 11 and 12, arms 14 and cross tube 15 will tend to be carried along therewith, but due to the fact that the greatest amount of this weight lies on the rear side of the axle 10, as indicated in Figure 1, and will accordingly set up a greater resistance to following the axle 10 than the amount of weight forward of the same, there will be a tendency toward relative movement of the knuckles 11 and 12, arms 14 and cross tube 15 in respect to the axle 10, to the left, causing the knuckles 11 and 12 to turn in a clockwise direction as viewed in Figure 1 and therefore turning the wheels 16. If the left wheel 16 is lifted a similar but reversed action of the parts will occur.

In accordance with the present invention, which contemplates the elimination of shimmying due to this relative endwise movement of the axle 10, the arms 21 and weights 22 are provided and are such that they counterbalance the normally unbalanced condition of the parts referred to forwardly and rearwardly of a plane passing through the axes of the king pins 13. In other words the weight-moments of the arms 21 and weights 22 balance the weight moments of those parts on the rear side of the axle 10 which are normally not balanced, so that should the axle 10 be shifted suddenly in the direction of its length, the weight moments of the parts mentioned on each side thereof balance each other and the parts move with the axle without changing their relative position in respect thereto. This, as is readily apparent, removes the cause of shimmying of these parts due to an unbalanced condition thereof in respect to the axle.

In Figure 4 the view is similar to that of Figure 3 with the exception that a conventional front wheel brake construction is shown in connection therewith. The knuckle in this case is provided with diagonally extending arms 23 which serve as a support for the dust cover 24 of the brake drum 25 carried by the wheel, and also as an anchor for the pivoted ends of the brake shoes 26 and as a support for the shaft 27 of the cam (not shown) which is employed for spreading the shoes 26. The shaft 27 is provided with a lever 28 which is operatively connected to the lever 29 by a link 30, the lever 29, whose free end is operable substantially in line with the king pin, being formed on the outer end of a shaft 31 supported in the bracket 32 secured to the end of the axle 10. A lever 33 secured to the inner end of the shaft 31 is connected to suitable brake applying means (not shown) by means of the rod 34, movement of which causes, through the levers and links described, rotation of the cam shaft 27 and consequent application of the brake. The lower end of the rear or lower arm 23 in this case is formed to take the place of the arms 14 employed in the construction shown in Figures 1, 2 and 3, and the cross tube 15 extends directly between these ends. It will be seen that in this construction a greater condition of unbalance exists than in the construction described previously in which no front wheel brakes were used, and this accounts for the relatively greater tendency of this structure to shimmy in comparison to the first described construction. In this case no extra arm, such as 21 of the previous construction, need be used as the upper or forwardly extending arm 23 may be employed for this purpose, and a balancing mass 35 secured directly to the extremity thereof to effect a condition of balance in the structure in accordance with the present invention.

So far the description and explanation have been confined to the balancing of a normally unbalanced structure by the addition of balancing masses, and such as to be readily adapted to balance an existing structure, but it will be apparent that a structure may be designed in accordance with the present invention without the addition of such masses and yet result in a balanced structure. Although a variety of structures may be used to attain this condition of balance, I show in Figure 5 one construction which illustrates this phase of the present invention. In order to simplify the description and explanation of this construction a case is taken in which a front wheel brake construction of the type shown in Figure 4 is employed. In conventional front wheel brake constructions of this type the diagonal arms 23 slant from the top and front to the bottom and rear on both wheels, and the links 30, levers 28, shafts 27, etc., are at the rear of the front axle 10 on both wheels 16, and the wheels are constrained to move in a predetermined relation to each other by a cross tube (as 15 in Fig. 4) which is entirely to the rear of the axle 10. This construction, as previously pointed out, without the addition of balancing masses, results in a highly unbalanced condition of the structure, but by using my invention as indicated in Figure 5, this structure may be placed in a condition of balance without the addition of balancing masses. This is effected by taking the identical brake structure of the left hand wheel, with the exception of the arm 19 which is only employed on that side, and using it on the right hand side of the axle. The positions of the parts of the brake structure on the right hand wheel are thus reversed, in fore and aft relation to the axle 10, with respect to the parts of the brake structure on the left hand wheel. In other words, the arm 23 on the right brake extends forwardly and downwardly while the arm 23 on the left hand wheel extends rearwardly and downwardly, and while on the left hand wheel the shaft 27, lever 28 and link 30 are to the rear of the axle 10, the same parts on the right hand side of the axle 10 lie to the front of the axle 10. The lever 33, which would ordinarily slant downwardly to the rear by using the identical construction for both brakes, is preferably turned to slant downwardly to the front so that the right hand brake rod 34 will act in tension when applying the brakes. Although this acts to put one link 30 in compression and the other link 30 in tension, this is not particularly objectionable. Instead of the usual cross rod (such as 15 in the constructions previously described) two short cross rods 36 are employed, one of which lies forwardly of the axle 10 and the other of which lies to the rear thereof, thus balancing each other. The inner end of each cross rod 36 is connected to the opposite extremities of a lever 37 pivoted midway between its ends at 38 to the center of the axle 10 so as to swing in a substantially horizontal plane. The wheels 16 are thus constrained to the same relative movement in respect to each other as described in the previous constructions. It will be readily seen from the foregoing that the construction in Figure 5 is balanced forwardly and rearwardly of the axle 10 and no additional balance masses are employed to effect this result.

Formal changes may be made in the specific embodiment of the invention described, without departing from the spirit and substance of broad invention, the scope of which is commensurate with the appended claims.

What I claim is:

1. In an automobile, in combination with a front axle, steering knuckles pivotally mounted on said axle, oppositely disposed arms on each of said knuckles, a cross tube connecting said arms on the same side of said axle, and means for balancing said knuckles, arms and cross tube forwardly and rearwardly of said axle comprising weights secured to the arms forwardly of said axle.

2. In an automobile, a front axle, front wheels having brakes including dust covers supported by said steering knuckles pivoted to said axle, means for steering said wheels, brake operating mechanism supported by said steering knuckles, and weights mounted on said dust covers on the side of the axle opposite the steering means to equalize the weight moments thereof forwardly and rearwardly of a plane passing through the axis of the steering knuckles.

3. In an automobile, front wheels having brakes thereon, a front axle, steering knuckles supporting said wheels pivoted to said axle, brake operating mechanism supported by said knuckles, a steering cross-tube positioned rearwardly of said axle connecting said knuckles, and weights positioned forwardly of said axle connected to said knuckles to balance the weight moments of said knuckles, brake mechanism, and cross-tube forwardly and rearwardly of said axle.

Signed by me at South Bend, Indiana, this 18th day of November, 1926.

CLYDE R. PATON.